US010632860B2

(12) United States Patent
Suzuki et al.

(10) Patent No.: US 10,632,860 B2
(45) Date of Patent: Apr. 28, 2020

(54) CONTROLLER FOR VEHICLE

(71) Applicant: TOYOTA JIDOSHA KABUSHIKI KAISHA, Toyota-shi (JP)

(72) Inventors: Takeaki Suzuki, Toyota (JP); Hiroshi Majima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 165 days.

(21) Appl. No.: 15/889,772

(22) Filed: Feb. 6, 2018

(65) Prior Publication Data
US 2018/0229614 A1 Aug. 16, 2018

(30) Foreign Application Priority Data
Feb. 14, 2017 (JP) ................................. 2017-024734

(51) Int. Cl.
*B60L 53/00* (2019.01)
*H02J 7/14* (2006.01)
*B60L 15/20* (2006.01)

(52) U.S. Cl.
CPC ........... *B60L 53/00* (2019.02); *B60L 15/2009* (2013.01); *H02J 7/1423* (2013.01); *B60L 2240/36* (2013.01); *B60L 2240/423* (2013.01); *B60L 2240/525* (2013.01); *Y02T 10/7005* (2013.01); *Y02T 10/7077* (2013.01)

(58) Field of Classification Search
CPC ............... B60L 53/00; B60L 2240/423; B60L 2240/36; B60L 15/2009; B60L 2240/525; H02J 7/1423; Y02T 10/7005; Y02T 10/7077

See application file for complete search history.

(56) References Cited

U.S. PATENT DOCUMENTS 5,422,517 A * 6/1995 Verney .................... H02H 7/06
307/29
6,133,713 A * 10/2000 Brotto ................... H02J 7/0081
320/137
9,815,376 B2 * 11/2017 Horitake ............... B60W 10/26
(Continued)

FOREIGN PATENT DOCUMENTS

JP 2007-228721 9/2007
JP 2013-237381 11/2013
JP 2016-123212 7/2016

OTHER PUBLICATIONS

Greg Albright, "A Comparison of Lead Acid to Lithium-ion in Stationary Storage Applications," Mar. 2012, All Cell Technologies LLC, pp. 1-14 (Year: 2012).*

*Primary Examiner* — Pinping Sun
(74) *Attorney, Agent, or Firm* — Oblon, McClelland, Maier & Neustadt, L.L.P.

(57) ABSTRACT

A vehicle for a controller includes an electronic control unit which includes an alternator that can generate electric power using rotation of an engine and a first battery and a second battery that can be charged by the alternator. The first battery is connected in parallel to the alternator and the second battery is connected in parallel to the alternator and the first battery via a second switch. The electronic control unit is configured not to charge the second battery with regenerative power generated by the alternator by switching the second switch to an OFF state when the temperature of the alternator is higher than a first predetermined value.

18 Claims, 4 Drawing Sheets

(56) References Cited

U.S. PATENT DOCUMENTS

| | | | |
|---|---|---|---|
| 2004/0040375 A1* | 3/2004 | Kadota | B60K 6/00 |
| | | | 73/115.02 |
| 2014/0111121 A1* | 4/2014 | Wu | B60L 58/20 |
| | | | 318/139 |
| 2015/0202984 A1* | 7/2015 | Wyatt | B60L 58/20 |
| | | | 320/109 |
| 2015/0329007 A1* | 11/2015 | Matsunaga | H01M 10/441 |
| | | | 320/126 |
| 2016/0039370 A1* | 2/2016 | Suzuki | B60L 58/20 |
| | | | 307/10.1 |
| 2016/0089992 A1* | 3/2016 | Le | H02J 7/0003 |
| | | | 320/107 |
| 2016/0185240 A1 | 6/2016 | Horitake et al. | |
| 2016/0254212 A1* | 9/2016 | Kusaka | H01L 23/34 |
| | | | 361/699 |
| 2017/0141589 A1* | 5/2017 | Inoue | H02J 7/00 |
| 2018/0265021 A1* | 9/2018 | Koishi | H02J 7/34 |
| 2018/0370382 A1* | 12/2018 | Kinoshita | B60L 58/12 |
| 2019/0103629 A1* | 4/2019 | Koike | H01M 10/44 |

* cited by examiner

CONTROLLER FOR VEHICLE

CROSS-REFERENCE TO RELATED APPLICATIONS

This application claims priority to Japanese Patent Application No. 2017-024734 filed on Feb. 14, 2017, which is incorporated herein by reference in its entirety.

BACKGROUND

1. Technological Field

The present disclosure relates to a controller for a vehicle.

2. Description of Related Art

In the related art, a vehicle including a power generator that can generate electric power using rotation of an engine and a first battery and a second battery that can be charged with the electric power generated by the power generator is known (for example, see Japanese Unexamined Patent Application Publication No 2016-123212 (JP 2016-123212 A)). In such a vehicle, since an amount of electric power generated by the power generator increases with improvement in charging performance, a load on the power generator is likely to increase.

SUMMARY

In such a vehicle, when the load on the power generator increases and a power-generation voltage of the power generator is decreased to protect the power generator, there is concern that operations of auxiliary machines will be affected by a change of the voltage.

The present disclosure has been made to solve the above-mentioned problem and provides a controller for a vehicle that can prevent occurrence of a change in voltage while protecting a power generator.

According to a first aspect of the present disclosure, there is provided a controller for a vehicle, the vehicle including a power generator configured to generate electric power using rotation of an engine which is mounted in the vehicle, a first battery configured to be charged by the power generator, the first battery being connected in parallel to the power generator, and a second battery configured to be charged by the power generator via a switch, the second battery being connected in parallel to the power generator and the first battery. The controller for the vehicle includes an electronic control unit. The electronic control unit is configured not to charge the second battery with regenerative power generated by the power generator by opening the switch when it is predicted that a load on the power generator will increase. The load on the power generator is, for example, a thermal load that affects durability of the power generator.

With the controller for the vehicle having the above-mentioned configuration, when the second battery is not charged, an amount of electric power generated from the power generator can be decreased accordingly. Accordingly, it is possible to achieve a decrease in a load on the power generator without decreasing a power-generation voltage of the power generator.

In the controller for a vehicle, the electronic control unit may be configured to hold the switch closed when it is predicted that the load on the power generator increases and a power-generation torque of the power generator is greater than a predetermined threshold value.

According to this configuration of the controller, since occurrence of an insufficient braking torque can be prevented during power regeneration, it is possible to prevent a decrease in drivability.

In the controller, the electronic control unit may be configured to open the switch when it is predicted that a load on the power generator increases and the power-generation torque of the power generator is less than the predetermined threshold value.

According to this configuration of the controller, it is possible to prevent a decrease in drivability and to prevent the second battery from being charged with regenerative power.

In the controller, an output power or a capacity of the second battery may be higher than the output power or the capacity of the first battery respectively. In the controller, the output power and the capacity of the second battery may be higher than the output power and the capacity of the first battery respectively.

According to this configuration of the controller, it is possible to greatly reduce a load on the power generator by detaching the second battery.

In the controller for a vehicle, the electronic control unit may be configured to perform control such that the case in which it is predicted that a load on the power generator increases includes a case in which a temperature of the power generator is higher than a predetermined temperature.

According to this configuration of the controller, when the temperature of the power generator is higher than the predetermined temperature, it is possible to prevent the second battery from being charged with regenerative power by opening the switch.

In the controller, the electronic control unit may be configured to perform control such that the case in which it is predicted that a load on the power generator increases includes a case in which an increase in temperature per unit time of the power generator is greater than a predetermined increase.

According to this configuration of the controller, when the increase in temperature per unit time of the power generator is greater than the predetermined increase, it is possible to prevent the second battery from being charged with regenerative power by opening the switch.

The electronic control unit may be configured to perform control such that the case in which it is predicted that a load on the power generator increases includes a case in which the number of times of an increase in temperature per unit time of the power generator being greater than a predetermined increase is equal to or greater than a predetermined number of times.

According to this configuration of the controller, when the number of times of an increase in temperature per unit time of the power generator being greater than the predetermined increase is equal to or greater than the predetermined number of times, it is possible to prevent the second battery from being charged with regenerative power by opening the switch.

With the controller for a vehicle according to the present disclosure, it is possible to prevent occurrence of a change in voltage while protecting a power generator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment which is an example of the present disclosure will be described with reference to the accompanying drawings.

First, a controller for a vehicle 100 according to an embodiment of the present disclosure will be described with reference to FIGS. 1 and 2.

Figure 1:
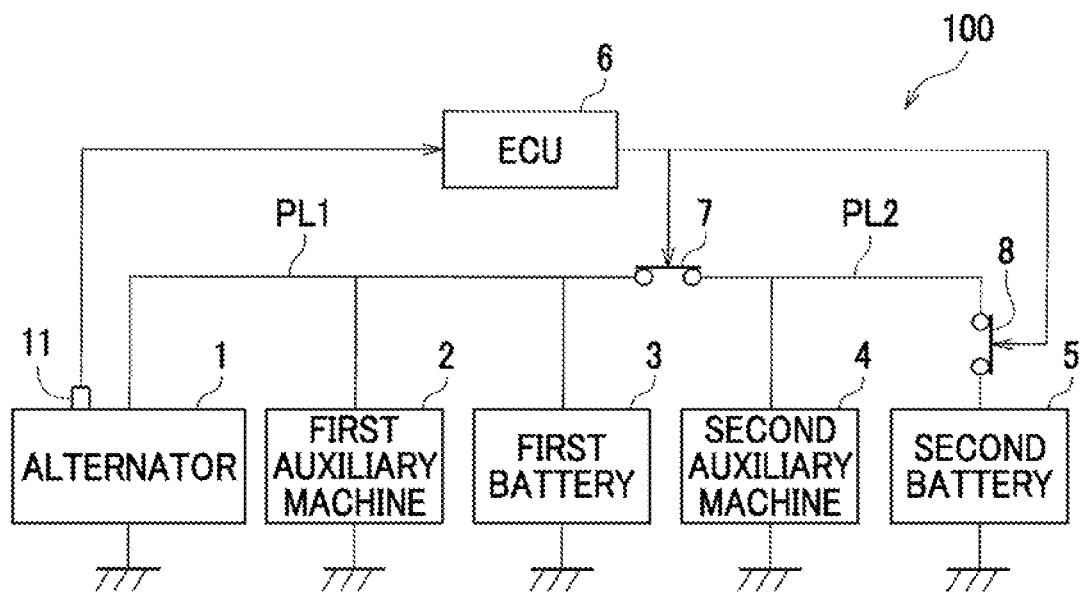
FIG. 1 is a diagram schematically illustrating a configuration of a vehicle including an ECU according to an embodiment of the present disclosure.
Figure 2:
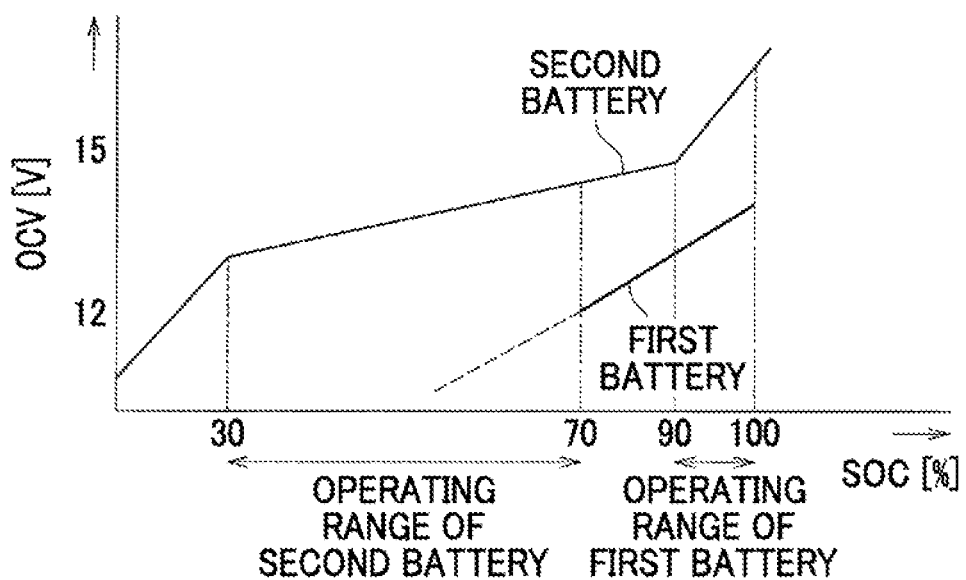
FIG. 2 is a graph illustrating an example of a relationship between states of charge (SOCs) and an open-circuit voltage (OCV) of a first battery and a second battery illustrated in FIG. 1.

As illustrated in FIG. 1, the vehicle 100 includes an alternator 1, a first auxiliary machine 2, a first battery 3, a second auxiliary machine 4, a second battery 5, and a controller including an ECU 6. The vehicle 100 is configured to output a driving force for traveling from an engine (an internal combustion engine) which is not illustrated.

The alternator 1 is configured to generate electric power using rotation of the engine. In the alternator 1, an amount of generated electric power can be adjusted by adjusting a power-generation voltage. Electric power generated by the alternator 1 is used to charge the first battery 3 and the second battery 5 or to drive the first auxiliary machine 2 and the second auxiliary machine 4. The alternator 1 is an example of a "power generator" in the claims.

For example, the alternator 1 includes an AC power generator that generates an AC current by electromagnetic induction, a rectifier that converts the AC current into a DC current, and a regulator that adjusts a voltage of the DC current. The AC power generator includes a stator in which a power-generation coil is provided and a rotor in which an excitation coil is provided, and the rotor is connected to an output shaft of the engine. In the AC power generator, an AC current depending on a current in the excitation coil (an excitation current) is generated in the power-generation coil when the rotor rotates. The regulator is configured to adjust a power-generation voltage of the alternator 1 by adjusting a current which is supplied to the excitation coil.

The first auxiliary machine 2 is a load device which is mounted in the vehicle and is an auxiliary machine which does not require a backup power supply. The first auxiliary machine 2 is configured to operate with electric power which is supplied from the first alternator 1, the first battery 3, and the second battery 5. An example of the first auxiliary machine 2 is a light.

The first battery 3 is configured to store electric power which is generated by the alternator 1 and to supply the stored electric power to the first auxiliary machine 2 and the second auxiliary machine 4. The first battery 3 is, for example, a lead storage battery with a rated voltage of 12 V. Accordingly, the first battery 3 operates, for example, such that a state of charge (SOC) ranges from 90% to 100% as illustrated in FIG. 2.

As illustrated in FIG. 1, the second auxiliary machine 4 is a load device which is mounted in the vehicle and is an auxiliary machine which requires a backup power supply. That is, the second auxiliary machine 4 is an auxiliary machine that requires a higher reliability than that of the first auxiliary machine 2. The second auxiliary machine 4 is configured to operate with electric power supplied from the alternator 1, the first battery 3, and the second battery 5. An example of the second auxiliary machine 4 is a shift-by-wire system.

The second battery 5 is configured to store electric power which is generated by the alternator 1 and to supply the stored electric power to the first auxiliary machine 2 and the second auxiliary machine 4. The second battery 5 is, for example, a nickel-hydride secondary battery with a rated voltage of 12 V. Accordingly, the second battery 5 operates such that the SOC ranges from 30% to 70% as illustrated in FIG. 2. The second battery 5 has a higher output power and a higher capacity than the first battery 3. That is, the second battery 5 has a higher output density and a higher energy density than the first battery 3. The second battery 5 is configured to serve as a backup power supply for the second auxiliary machine 4 as will be described later.

The ECU 6 is configured to control the vehicle 100 as illustrated in FIG. 1. For example, the ECU 6 controls the power-generation voltage of the alternator 1 such that the SOCs of the first battery 3 and the second battery 5 have appropriate values. The ECU 6 is configured to operate with electric power which is supplied from the alternator 1, the first battery 3, and the second battery 5. A "controller for a vehicle" in the claims includes, for example, the ECU 60.

The ECU 6 includes a CPU, a ROM, a RAM, a backup RAM, and an input/output interface. For example, the ECU 6 is connected to a temperature sensor 11 that detects the temperature of the alternator 1, a current sensor that detects a charging/discharging current of the first battery 3, a voltage sensor that detects a voltage of the first battery 3, a temperature sensor that detects the temperature of the first battery 3, a current sensor that detects a charging/discharging current of the second battery 5, a voltage sensor that detects a voltage of the second battery 5, and a temperature sensor that detects the temperature of the second battery 5, and the like. The SOC is calculated, for example, based on an integrated value of the charging/discharging current.

One end of each of the alternator 1, the first auxiliary machine 2, and the first battery 3 is connected to a power supply line PL1 and the other end is grounded. Accordingly, the alternator 1, the first auxiliary machine 2, and the first battery 3 are connected in parallel.

One end of the second auxiliary machine 4 is connected to a power supply line PL2 and the other end is grounded. The power supply line PL2 is connected to the power supply line PL1 via a first switch 7. That is, the second auxiliary machine 4 is connected in parallel to the alternator 1, the first auxiliary machine 2, and the first battery 3 via the first switch 7.

One end of the second battery 5 is connected to the power supply line PL2 via a second switch 8 and the other end is grounded. That is, the second battery 5 is connected in parallel to the second auxiliary machine 4 via the second switch 8. The second battery 5 is connected in parallel to the alternator 1, the first auxiliary machine 2, and the first battery 3 via the first switch 7 and the second switch 8.

The first switch 7 and the second switch 8 are, for example, electromagnetic relays and are configured such that opening/closing thereof is controlled by the ECU 6. The second switch 8 is an example of a "switch" in the claims.

The ECU 6 is configured to close (turn on) the first switch 7 and the second switch 8 in a normal state. Accordingly, the first auxiliary machine 2 and the second auxiliary machine 4 are supplied with electric power from one of the alternator 1, the first battery 3, and the second battery 5. When the power-generation voltage of the alternator 1 is higher than open-circuit voltages (OCVs) of the first battery 3 and the second battery 5, the first battery 3 and the second battery 5 are charged with electric power generated by the alternator 1.

The ECU 6 is configured to close the second switch 8 and to open (turn off) the first switch 7 when the first battery 3 malfunctions or the power supply line PL1 is grounded. At this time, the second auxiliary machine 4 is supplied with electric power from the second battery 5, and the second auxiliary machine 4 can operate. The ECU 6 is configured to close the first switch 7 and open the second switch 8 when the second battery 5 deteriorates. Accordingly, the second battery 5 can be detached from the power supply line PL2. In the following description, it is assumed that such a problem does not occur, that is, the vehicle is in a normal state, but the second switch 8 may be opened even in the normal state as will be described later. In the following description, the closed/open states of the first switch 7 and the second switch 8 are rephrased as ON/OFF states.

In such a vehicle 100, the first auxiliary machine 2 and the second auxiliary machine 4 are mainly supplied with electric power from the first battery 3 and the second battery 5 and power generation by the alternator 1 is suppressed to achieve an improvement in fuel efficiency when the vehicle travels at a constant speed or accelerates, and the first battery 3 and the second battery 5 are charged with regenerative power generated by the alternator 1 at the time of deceleration braking. That is, a power-generation load at the time of operation of the engine is reduced to achieve an improvement in fuel efficiency and the first battery 3 and the second battery 5 are charged by the regenerative power generation at the time of non-operation of the engine.

Specifically, the ECU 6 is configured to switch both the first switch 7 and the second switch 8 to the ON state and to perform regeneration control using both the first battery 3 and the second battery 5 when the temperature of the alternator 1 is equal to or lower than a first predetermined value Th1 at the time of deceleration braking. The first predetermined value Th1 is a preset value and is a high temperature value (for example, 120° C.) before the alternator 1 enters an overheated state. The first predetermined value Th1 is an example of a "predetermined temperature" in the claims.

In this embodiment, the ECU 6 is configured to switch the second switch 8 to the OFF state and to perform regeneration control using only the first battery 3 when the temperature of the alternator 1 is higher than the first predetermined value Th1 at the time of deceleration braking. Accordingly, since the second battery 5 is detached, an amount of electric power generated by the alternator 1 decreases and it is possible to suppress an increase in temperature of the alternator 1. The case in which the temperature of the alternator 1 is higher than the first predetermined value Th1 is an example of a "case in which it is predicted that the load on the power generator increases" in the claims.

The ECU 6 is configured to prohibit the regeneration control when the temperature of the alternator 1 is higher than a second predetermined value Th2 at the time of deceleration braking. The second predetermined value Th2 is a preset value which is greater than the first predetermined value Th1 and is a high temperature value (for example, 180° C. at which the alternator 1 enters an overheated state.

—Control by ECU at the Time of Deceleration Braking—

An example of control which is performed by the ECU 6 at the time of deceleration braking of the vehicle 100 will be described below with reference to FIG. 3. In the following flow, only the control at the time of deceleration braking will be described and the control at the time of traveling at a constant speed or acceleration will not be described. The following steps are performed by the ECU 6.

Figure 3:
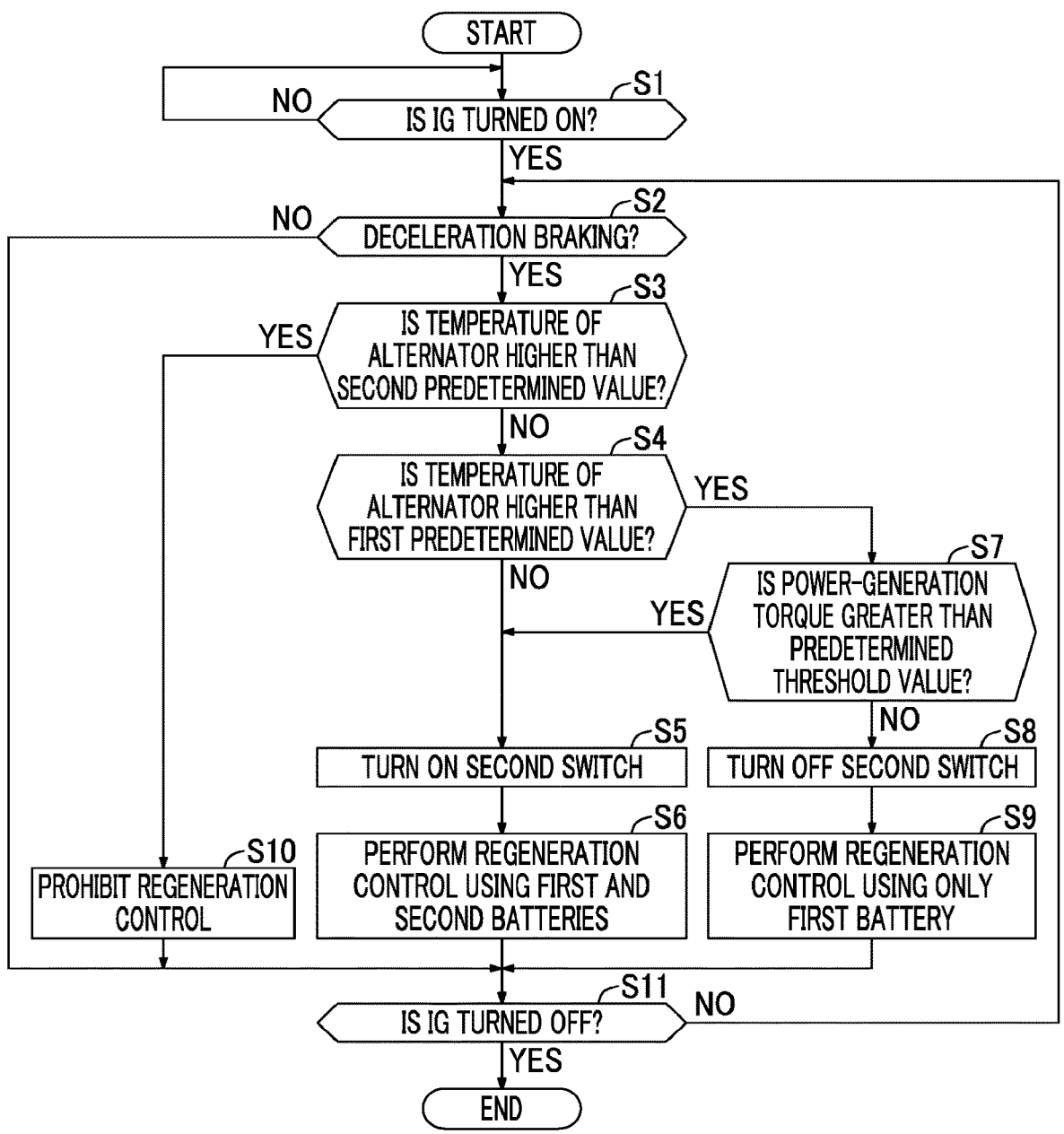
FIG. 3 is a flowchart illustrating an example of a control routine which is performed by the ECU at the time of deceleration braking of the vehicle in a controller according to the embodiment.

First, in Step S1 in FIG. 3, it is determined whether an operation of turning an ignition switch (not illustrated) on has been performed. When it is determined that an operation of turning the ignition switch on has been performed, the control routine transitions to Step S2. At the time of transitioning to Step S2, the first switch 7 and the second switch 8 are in the ON state. On the other hand, when it is determined that an operation of turning the ignition switch on has not been performed, Step S1 is repeatedly performed. That is, the control routine waits for an operation of the ignition switch being turned on.

Then, in Step S2, it is determined whether deceleration braking is being performed. For example, when depression of an accelerator pedal (not illustrated) is released during traveling of the vehicle, it is determined that deceleration braking is being performed. When it is determined that deceleration braking is being performed, the control routine transitions to Step S3. On the other hand, when it is determined that deceleration braking is not being performed, the control routine transitions to Step S11.

Then, in Step S3, it is determined whether the temperature of the alternator 1 is higher than the second predetermined value Th2. The temperature of the alternator 1 is determined based on a detection result of the temperature sensor 11. When it is determined that the temperature of the alternator 1 is not higher than the second predetermined value Th2 (when the temperature of the alternator 1 is equal to or lower than the second predetermined value Th2), the control routine transitions to Step S4. On the other hand, when it is determined that the temperature of the alternator 1 is higher than the second predetermined value Th2, the control routine transitions to Step S10.

Then, in Step S4, it is determined whether the temperature of the alternator 1 is higher than the first predetermined value Th1. When it is determined that the temperature of the alternator 1 is not higher than the first predetermined value Th1 (when the temperature of the alternator 1 is equal to or lower than the first predetermined value Th1), the control routine transitions to Step S5. On the other hand, when it is determined that the temperature of the alternator 1 is higher than the first predetermined value Th1, the control routine transitions to Step S7.

Then, in Step S5, the second switch 8 is switched to the ON state. The second switch 8 is maintained in the ON state when the second switch 8 is in the ON state, and the second switch 8 is switched to the ON state when the second switch 8 is in the OFF state.

Then, in Step S6, regeneration control is performed using both the first battery 3 and the second battery 5. In the regeneration control, the power-generation voltage of the alternator 1 is adjusted, for example, based on the SOCs, the temperatures, and degrees of deterioration of the first battery 3 and the second battery 5. Accordingly, when the first battery 3 and the second battery 5 are chargeable, the first battery 3 and the second battery 5 are charged with the regenerative power generated by the alternator 1 by setting the power-generation voltage of the alternator 1 to be higher than the OCVs of the first battery 3 and the second battery 5. The regeneration control is control of varying the power-generation voltage of the alternator 1, but since the variation of the power-generation voltage is gradual, the variation does not adversely affect the first auxiliary machine 2 and the second auxiliary machine 4. Thereafter, the control routine transitions to Step S11.

When the temperature of the alternator 1 is higher than the first predetermined value Th1 (YES in Step S4), it is determined in Step S7 whether the power-generation torque of the alternator 1 is greater than a predetermined threshold value. The power-generation torque is a torque of power generation (a braking torque for the engine) in the alternator 1 at the time of regenerative braking. The predetermined threshold value is, for example, a preset value and is a threshold value for determining whether drivability will decrease due to an insufficient braking torque which occurs when the second battery 5 is detached while the regeneration control is being performed using both the first battery 3 and the second battery 5. When it is determined that the power-generation torque of the alternator 1 is not greater than the predetermined threshold value (when the power-generation torque is equal to or less than the predetermined threshold value), the insufficient braking torque is small and the drivability will not decrease even when detaching the second battery 5, and thus the control routine transitions to Step S8. On the other hand, when it is determined that the power-generation torque of the alternator 1 is greater than the predetermined threshold value, the insufficient braking torque is large and the drivability will decrease when detaching the second battery 5, and the control routine transitions to Step S5. That is, in this case, in order to suppress a decrease in drivability, the regeneration control continues to be performed using both the first battery 3 and the second battery 5 without detaching the second battery 5.

Then, in Step S8, the second switch 8 is brought into the OFF state. The second switch 8 is switched to the OFF state when the second switch 8 is in the ON state, and the second switch 8 is maintained in the OFF state when the second switch 8 is in the OFF state.

In Step S9, since the second battery 5 is detached, the regeneration control is performed using only the first battery 3. In the regeneration control, the power-generation voltage of the alternator 1 is adjusted, for example, based on the SOC, the temperature, and the degree of deterioration of the first battery 3. Accordingly, when the first battery 3 is chargeable, the first battery 3 is charged with regenerative electric power generated by the alternator 1 by setting the power-generation voltage of the alternator 1 to be higher than the OCV of the first battery 3. Accordingly, since the second battery 5 is not charged, the power-generation current of the alternator 1 decreases accordingly and an increase in temperature of the alternator 1 is suppressed. The regeneration control is control of varying the power-generation voltage of the alternator 1, but the variation of the power-generation voltage is gradual and thus does not adversely affect the first auxiliary machine 2 and the second auxiliary machine 4. Thereafter, the control routine transitions to Step S11.

When the temperature of the alternator 1 is higher than the second predetermined value Th2 (YES in Step S3), the regeneration control is prohibited in Step S10. When the regeneration control is prohibited, the power-generation voltage of the alternator 1 is fixed to a predetermined value. The predetermined value is, for example, a voltage value at which a power-generation current that can suppress an increase in temperature of the alternator 1 is obtained. Accordingly, it is possible to prevent overheating of the alternator 1. Thereafter, the control routine transitions to Step S11.

Then, in Step S11, it is determined whether an operation of turning the ignition switch off has been performed. When it is determined that the operation of turning the ignition switch off has been performed, the control routine ends. On the other hand, when the operation of turning the ignition switch off has been performed, the control routine returns to Step S2.

—Operation at the Time of Traveling of Vehicle—

Figure 4:
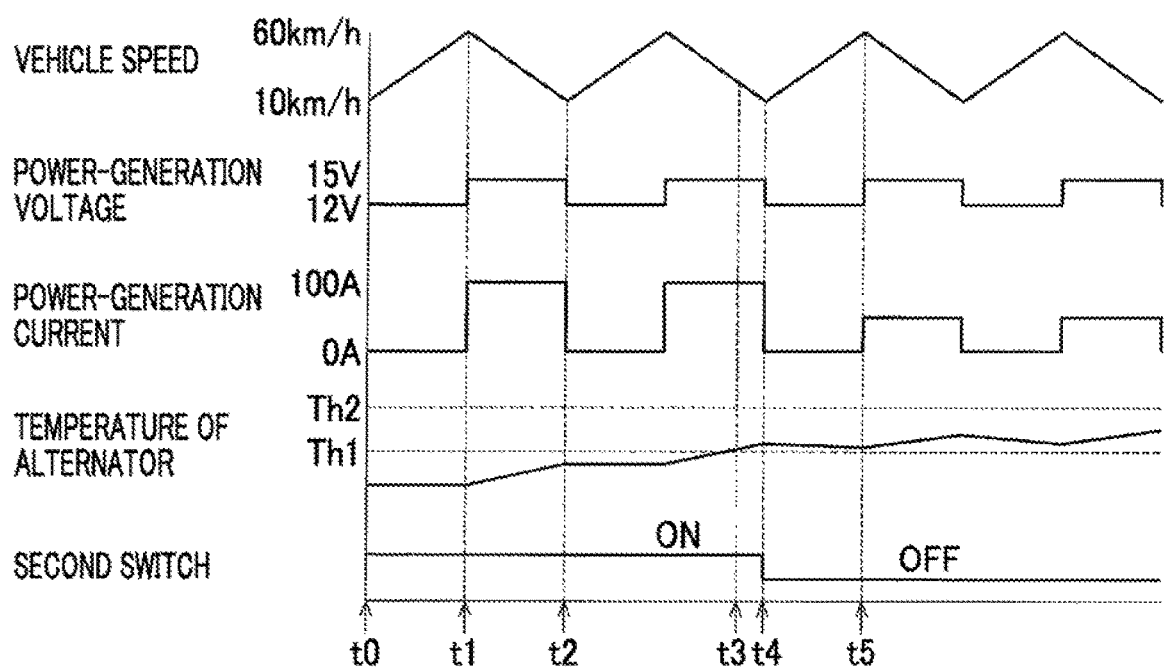
FIG. 4 is a timing chart illustrating an example of an operation at the time of traveling of the vehicle in the controller according to the embodiment.

An example of an operation at the time of traveling of a vehicle will be described below with reference to FIG. 4. In the following description, it is assumed that acceleration and deceleration are repeated in the vehicle 100.

First, in a period from time t0 to time t1, the vehicle 100 is subjected to acceleration. At this time, the first switch 7 and the second switch 8 are in the ON state. The power-generation voltage of the alternator 1 is set to 12 V by the ECU 6. At this time, since the OCVs of the first battery 3 and the second battery 5 are higher than the power-generation voltage of the alternator 1, the power-generation current of the alternator 1 is 0 A and the first battery 3 and the second battery 5 are not charged. The first auxiliary machine 2 and the second auxiliary machine 4 are driven with the electric power supplied from the first battery 3 and the second battery 5. Accordingly, since electric power is not generated by the alternator 1, it is possible to achieve an improvement in fuel efficiency.

In a period from time t1 to time t2, the vehicle 100 is subjected to deceleration braking. At this time, since the temperature of the alternator 1 is equal to or lower than the first predetermined value Th1, the second switch 8 is maintained in the ON state. The power-generation voltage of the alternator 1 is set to 15 V by the ECU 6. At this time, since the power-generation voltage of the alternator 1 is higher than the OCVs of the first battery 3 and the second battery 5, the power-generation current of the alternator 1 flows and the first battery 3 and the second battery 5 are charged. Accordingly, the temperature of the alternator 1 increases.

At time t3 during deceleration braking, the temperature of the alternator 1 becomes higher than the first predetermined value Th1. At this time, since the power-generation torque of the alternator 1 is greater than the predetermined threshold value, the second switch 8 is not switched to the OFF state but is maintained in the ON state. Accordingly, it is possible to minimize occurrence of an insufficient braking torque. At time t4, when the power-generation torque of the alternator 1 is less than the predetermined threshold value, the second switch 8 is switched to the OFF state.

Thereafter, at time t5 at which the deceleration braking is started, since the temperature of the alternator 1 is higher than the first predetermined value Th1 and the power-generation torque of the alternator 1 is less than the predetermined threshold value, the second switch 8 is in the OFF state. Then, the power-generation voltage of the alternator 1 is set to 15 V by the ECU 6. At this time, since the power-generation voltage of the alternator 1 is greater than the OCV of the first battery 3, the power-generation current of the alternator 1 flows and the first battery 3 is charged. Here, since the second battery 5 is detached and is not charged, the power-generation current of the alternator 1 decreases accordingly. That is, it is possible to decrease an amount of generated electric power without decreasing the power-generation voltage at the time of regenerative power generation. Accordingly, an increase in temperature of the alternator 1 is minimized. As a result, the temperature of the alternator 1 is less likely to become higher than the second predetermined value Th2.

Advantages

In this embodiment, as described above, when the temperature of the alternator 1 is higher than the first predetermined value Th1 at the time of deceleration braking, the second battery 5 is not charged due to switching the second switch 8 to the OFF state and it is thus possible to decrease an amount of electric power generated by the alternator 1 accordingly. That is, by detaching the second battery 5, it is possible to decrease the power-generation current without changing the power-generation voltage of the alternator 1. Accordingly, it is possible to minimize an increase in temperature of the alternator 1 without decreasing the power-generation voltage of the alternator 1. Accordingly, it is possible to prevent occurrence of a change in voltage while protecting the alternator 1. As a result, it is possible to prevent the operations of the first auxiliary machine 2 and the second auxiliary machine 4 from being affected while protecting the alternator 1.

In this embodiment, when the temperature of the alternator 1 is higher than the first predetermined value Th1 and the power-generation torque of the alternator 1 is greater than the predetermined threshold value, an insufficient braking torque is prevented from occurring during regenerative power generation by switching the second switch 8 to the ON state, and it is thus possible to minimize a decrease in drivability. When the temperature of the alternator 1 is higher than the first predetermined value Th1 and the power-generation torque of the alternator 1 is less than the predetermined threshold value, it is possible to prevent the second battery 8 from being charged with regenerative power while minimizing a decrease in drivability by switching the second switch 8 to the OFF state.

In this embodiment, when the temperature of the alternator 1 is higher than the second predetermined value Th2 at the time of deceleration braking, it is possible to prevent overheating of the alternator 1 by prohibiting the regeneration control. When the regeneration control is prohibited during the regeneration control, a change in voltage occurs, but an increase in temperature of the alternator 1 is minimized by performing the regeneration control using only the first battery 3, and thus it is difficult to prohibit the regeneration control.

In this embodiment, by detaching the second battery 5 which has a higher output power than the first battery 3, it is possible to effectively minimize an increase in temperature of the alternator 1.

Other Embodiments

The embodiment disclosed here is exemplary in all respects and does not serve as a basis for limiting interpretation. Accordingly, the technical scope of the present disclosure is not defined only by the above-mentioned embodiment, but is defined by description in the appended claims. The technical scope of the present disclosure includes all modifications which are included in the scope of the appended claims and scopes equivalent to the scope.

For example, in this embodiment, the second switch 8 is switched to the OFF state when the temperature of the alternator 1 is higher than the first predetermined value Th1 (a first condition), but the present disclosure is not limited thereto. When an increase in temperature per unit time of the alternator is greater than a predetermined increase due to instantaneous flowing of an excessive current in the alternator (a second condition), the second switch may be switched to the OFF state. When the number of times of an increase in temperature per unit time of the alternator being greater than the predetermined increase due to pulse-like flowing of an excessive current in the alternator is greater than a predetermined number of times (a third condition), the second switch may be switched to the OFF state. The second condition and the third condition are examples of the "case in which it is predicted that the load on the power generator increases" in the claims. When one of the first condition, the second condition, and the third condition is satisfied, the second switch may be switched to the OFF state.

In this embodiment, the second switch 8 is set to the ON state when the temperature of the alternator 1 is higher than the first predetermined value Th1 and the power-generation torque of the alternator 1 is greater than the predetermined threshold value, but the present disclosure is not limited thereto. When the temperature of the alternator is higher than the first predetermined value, the second switch may be switched to the OFF state regardless of the magnitude of the power-generation torque of the alternator. That is, Step S7 in FIG. 3 may be skipped. The second switch may be set to the ON state when the temperature of the alternator is higher than the first predetermined value and the regeneration control is performed using both the first battery and the second battery, and the second switch may be set to the OFF state when the regeneration control is not performed using both the first battery and the second battery (when the regeneration control is started and when the regeneration control is being performed using only the first battery).

In this embodiment, the alternator 1 serving as a power generator is provided, but the present disclosure is not limited thereto. A motor generator serving as a power generator and an electric motor may be provided instead of the alternator.

In this embodiment, the first auxiliary machine 2 may be a single auxiliary machine or may be an auxiliary machine group including a plurality of auxiliary machines. The same is true of the second auxiliary machine 4.

In this embodiment, the second battery 5 is a nickel-hydride secondary battery, but the present disclosure is not limited thereto. The second battery may be a lithium-ion secondary battery.

In this embodiment, the second battery 5 has a higher output power and a higher capacity of the first battery 3, but the present disclosure is not limited thereto. The second battery may have a higher output power or a higher capacity than the first battery.

In this embodiment, the second switch 8 is an electromagnetic relay, but the present disclosure limited thereto. The second switch may be a semiconductor switch. The same is true of the first switch 7.

In this embodiment, it is determined that deceleration braking is performed when depression on an accelerator pedal is released, but the present disclosure is not limited thereto. When depression on an accelerator pedal is released and a brake pedal (not illustrated) is depressed, it may be determined that deceleration braking is being performed.

In this embodiment, the power-generation voltage of the alternator 1 is fixed to a predetermined value when the regeneration control is prohibited and the predetermined value is a voltage value at which the power-generation current capable of minimizing an increase in temperature of the alternator 1 is obtained, but the present disclosure is not limited thereto. The power-generation voltage of the alternator may be fixed to a predetermined value when the regeneration control is prohibited and the predetermined value may be a voltage value (for example, 12 V) at which the first battery and the second battery are not charged.

In this embodiment, when the regeneration control is prohibited, the second switch 8 may be maintained in the OFF state or the second switch 8 may be switched to the ON state.

Figure 5:
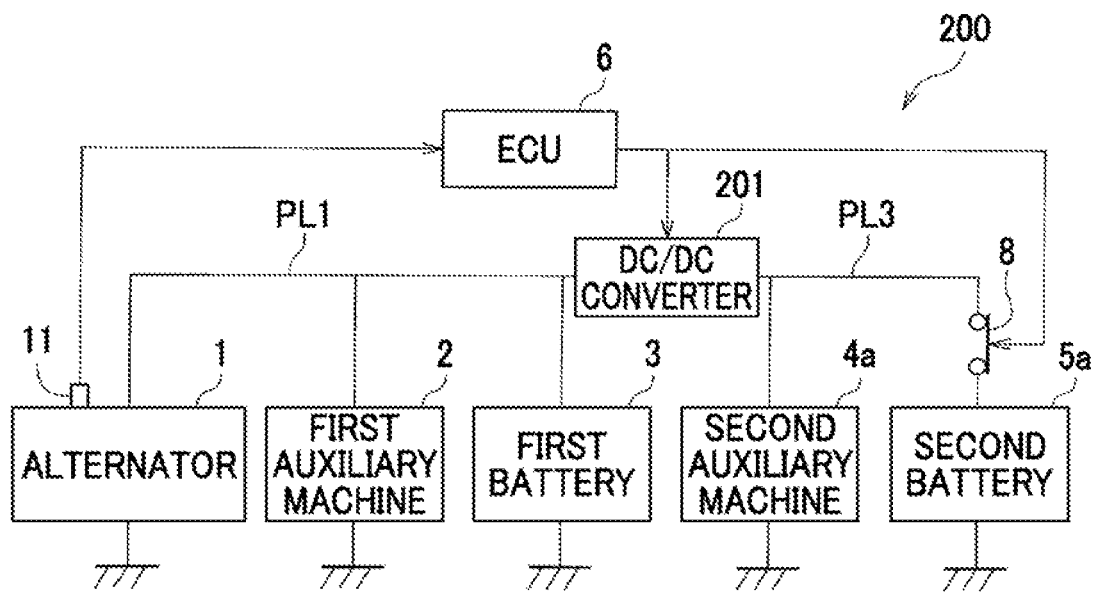
FIG. 5 is a diagram illustrating a vehicle according to a modified example of the embodiment.

In this embodiment, the first switch 7 is disposed between the power supply lines PL1 and PL2, but the present disclosure is not limited thereto. As in a vehicle 200 according to a modified example of this embodiment illustrated in FIG. 5, a DC/DC converter 201 may be disposed between power supply lines PL1 and PL3. In this case, the power supply line PL3 may have a higher voltage than the power supply line PL1 and the power supply line PL3 may have a lower voltage than the power supply line PL1, which is set depending on a second auxiliary machine 4*a* and a second battery 5*a* connected to the power supply line PL3. In the vehicle 200, the alternator 1 is connected to the power supply line PL1, but the present disclosure is not limited thereto. The alternator 1 may be connected to the power supply line PL3. That is, the alternator 1 may be provided on the second battery 5*a* side, not on the first battery 3 side.

In the flowchart in this embodiment, when the temperature of the alternator 1 is higher than the first predetermined value Th1, it is determined whether the power-generation torque of the alternator 1 is greater than the predetermined threshold value, but the present disclosure is not limited thereto. When the power-generation torque of the alternator 1 is less than the predetermined threshold value, it may be determined whether the temperature of the alternator 1 is higher than the first predetermined value Th1. That is, the flowchart in this embodiment is not limited, for example, in terms of the order thereof.

In this embodiment, it is determined whether the power-generation torque of the alternator 1 is greater than the predetermined threshold value, but the present disclosure is not limited thereto. It may be determined whether the power-generation current of the alternator is greater than a predetermined threshold value.

The present disclosure is applicable to a controller for a vehicle that controls a vehicle including a power generator that can generate electric power using rotation of an engine and a first battery and a second battery that can be charged by the power generator.

What is claimed is:

1. A controller for a vehicle, the vehicle including a power generator configured to generate electric power using rotation of an engine which is mounted in the vehicle, a first battery configured to be charged by the power generator, the first battery being connected in parallel to the power generator via no switch, and a second battery configured to be charged by the power generator, the second battery being connected in parallel to the power generator and the first battery via a switch, the controller comprising:
circuitry configured to not charge the second battery with regenerative power generated by the power generator by opening the switch when the circuitry predicts that a load on the power generator increases.

2. The controller according to claim 1, wherein the circuitry is configured to hold the switch closed when the circuitry predicts that the load on the power generator increases and a power-generation torque of the power generator is greater than a predetermined threshold value.

3. The controller according to claim 2, wherein the circuitry is configured to open the switch when the circuitry predicts that the load on the power generator increases and the power-generation torque of the power generator is less than the predetermined threshold value.

4. The controller according to claim 1, wherein an output power or a capacity of the second battery is higher than an output power or a capacity of the first battery respectively.

5. The controller according to claim 4, wherein the output power and the capacity of the second battery are higher than the output power and the capacity of the first battery respectively.

6. The controller according to claim 1, wherein the circuitry is configured to perform control such that the case in which the circuitry predicts the load on the power generator increases includes a case in which a temperature of the power generator is higher than a predetermined temperature.

7. The controller according to claim 1, wherein the circuitry is configured to perform control such that the case in which the circuitry predicts the load on the power generator increases includes a case in which an increase in temperature per unit time of the power generator is greater than a predetermined increase.

8. The controller according to claim 1, wherein the circuitry is configured to perform control such that the case in which the circuitry predicts the load on the power generator increases includes a case in which a number of times of an increase in temperature per unit time of the power generator being greater than a predetermined increase is equal to or greater than a predetermined number of times.

9. The controller according to claim 1, wherein the circuitry is configured to hold the switch closed when the circuitry predicts that the load on the power generator does not increase such that the first battery and the second battery are simultaneously connected to the to the power generator.

10. A vehicle, comprising:
an engine mounted in the vehicle;
a power generator configured to generate electric power using rotation of the engine;
a first battery configured to be charged by the power generator, the first battery being connected in parallel to the power generator via no switch;
a second battery configured to be charged by the power generator, the second battery being connected in parallel to the power generator and the first battery via a switch; and
circuitry configured to not charge the second battery with regenerative power generated by the power generator by opening the switch when the circuitry predicts that a load on the power generator increases.

11. The vehicle according to claim 10, wherein the circuitry is configured to hold the switch closed when the circuitry predicts that the load on the power generator increases and a power-generation torque of the power generator is greater than a predetermined threshold value.

12. The vehicle according to claim 11, wherein the circuitry is configured to open the switch when the circuitry predicts that the load on the power generator increases and the power-generation torque of the power generator is less than the predetermined threshold value.

13. The vehicle according to claim 10, wherein an output power or a capacity of the second battery is higher than an output power or a capacity of the first battery respectively.

14. The vehicle according to claim 13, wherein the output power and the capacity of the second battery are higher than the output power and the capacity of the first battery respectively.

15. The vehicle according to claim 10, wherein the circuitry is configured to perform control such that the case in which the circuitry predicts the load on the power generator increases includes a case in which a temperature of the power generator is higher than a predetermined temperature.

16. The vehicle according to claim 10, wherein the circuitry is configured to perform control such that the case in which the circuitry predicts the load on the power generator increases includes a case in which an increase in temperature per unit time of the power generator is greater than a predetermined increase.

17. The vehicle according to claim 10, wherein the circuitry is configured to perform control such that the case in which the circuitry predicts the load on the power generator increases includes a case in which a number of times of an increase in temperature per unit time of the power generator being greater than a predetermined increase is equal to or greater than a predetermined number of times.

18. The vehicle according to claim 10, wherein the circuitry is configured to hold the switch closed when the circuitry predicts that the load on the power generator does not increase such that the first battery and the second battery are simultaneously connected to the to the power generator.

* * * * *